UNITED STATES PATENT OFFICE.

HARRY H. PIERCE, OF TOLEDO, OHIO, ASSIGNOR TO THE NEW PROCESS LIME COMPANY, OF SAME PLACE.

PROCESS OF TREATING LIME.

SPECIFICATION forming part of Letters Patent No. 599,792, dated March 1, 1898.

Application filed March 5, 1897. Serial No. 626,020. (No specimens.)

*To all whom it may concern:*

Be it known that I, HARRY H. PIERCE, a citizen of the United States, residing at Toledo, Lucas county, Ohio, have invented a certain new and useful Process for the Treatment of Lime and the Product of such Process, of which the following is a specification.

The familiar objections and difficulties encountered in the storage, transportation, and use of common quicklime are its tendency to slake, heat, swell, and shrink, these changes frequently occurring after the lime is mixed and used with plaster and mortar, causing walls and ceilings to crack and chip off. Another well-known difficulty met with in the use of lime mortars and plasters is the length of time required for the same to become hard throughout the mass when in place. Heretofore all lime mortars have required the action of air and the absorption therefrom of carbonic-acid gas to render the work sufficiently hard. This process is an extremely slow and tedious one, the lapse of many years being sometimes necessary to cause this atmospheric action to form a carbonate of the whole mass and thus bring about the desired hardness of the mortar, except at or near the surface. My invention relates to and its object is to provide means for overcoming the objections and difficulties here pointed out, and more particularly to provide a process by which the lime in its preparation for use is artificially highly carbonized, thus causing mortars and plasters in which such lime is used to harden more rapidly and uniformly than heretofore.

In United States Letters Patent granted to me July 23, 1895, No. 543,452, I pointed out the advantages and claimed the process of treating lime which consists in, first, slaking quicklime to a putty; second, roasting said putty at a sufficient temperature to drive off all adhering or uncombined moisture, and, third, grinding the hard mass thus obtained to a powder. The process there described was found to serve admirably to prevent the slaking, heating, and swelling of lime when stored or in transit or when mixed with mortars and plasters. The slow and uniform hardening of the plaster and mortar above referred to were, however, found still to exist, and the present process is devised as an improvement upon the process patented as above stated.

In practicing my invention common quicklime is first slaked to a putty, which may then be screened to remove foreign substances and bits of hard or unslaked lime. This putty is now fed into one end of a revolving iron cylinder and is caused to travel slowly to the opposite end of the cylinder, where it is discharged and conveyed to the grinding and bolting machinery. Beneath the revolving cylinder is a fire of coke or the like, the combustion of which evolves carbon monoxid and carbon dioxid. These gases on their way to the smoke-stack pass through the cylinder in which the hydrated lime is being constantly tumbled and thoroughly agitated. The hot gases on their way through the cylinder absorb and carry off the excess of moisture, while the lime absorbs a large per cent. of carbon dioxid from said gases and is discharged from the cylinder thoroughly dried or roasted and highly carbonated. The degree of heat and the time of exposure will vary according to the condition of the putty and the amount of moisture present; but the heat and time of exposure should be sufficient to drive off the adhering or uncombined moisture. Care should be taken, however, not to subject the lime under treatment to a red heat or to such heat as will recalcine the lime, as such temperature will reconvert the mass to a quicklime. When the putty has been agitated and roasted in the presence of carbonic-acid gas, as above described, it becomes hard and white and of uniform structure, and should now as the last step of my process be ground or otherwise pulverized to the desired fineness. The lime is now ready for use.

The substance thus produced may be kept indefinitely without air-slaking, will not slake, heat, or change, retains its setting qualities, is always ready for use, and may be applied to any of the purposes for which lime is commonly used, and especially in plasters and mortars. Mortar in which this lime is used becomes uniformly hard in a short time, thus avoiding the tedious waiting for nature by atmospheric action to furnish the carbonic acid necessary to form the hard carbonates found in old mortars.

What I claim, and desire to secure by Letters Patent, is—

1. The herein-described process of treating lime which consists in, first, slaking quicklime to a putty; second, roasting the hydrate of lime thus formed in the presence of carbonic-acid gas, and third, grinding to a powder the product thus obtained, substantially as and for the purpose specified.

2. As an article of manufacture, lime which as quicklime has been slaked to a putty, then roasted in the presence of carbonic-acid gas, and then pulverized, substantially as and for the purpose specified.

HARRY H. PIERCE.

In presence of—
L. E. BROWN,
F. M. DOTSON.